United States Patent
Roberts et al.

(10) Patent No.: US 7,200,339 B1
(45) Date of Patent: Apr. 3, 2007

(54) METHOD AND APPARATUS FOR LASER LINE-WIDTH COMPENSATION

(75) Inventors: Kim Roberts, Nepean (CA); Maurice O'Sullivan, Ottawa (CA)

(73) Assignee: Nortel Networks Limited, St. Laurent, QC (CA)

(*) Notice: Subject to any disclaimer, the term of this patent is extended or adjusted under 35 U.S.C. 154(b) by 636 days.

(21) Appl. No.: 10/411,332

(22) Filed: Apr. 11, 2003

(51) Int. Cl.
H04B 10/00 (2006.01)
H04B 10/04 (2006.01)

(52) U.S. Cl. .................. 398/159; 398/158; 398/192; 398/194; 398/198

(58) Field of Classification Search ............. 398/159, 398/158, 192, 194, 198, 193, 26
See application file for complete search history.

(56) References Cited

U.S. PATENT DOCUMENTS

| | | | |
|---|---|---|---|
| 5,349,312 A | 9/1994 | Huettner et al. | |
| 5,446,574 A | 8/1995 | Djupsjobacka et al. | |
| 5,761,225 A | 6/1998 | Fidric et al. | 372/6 |
| 5,999,258 A | 12/1999 | Roberts | 356/345 |
| 6,252,692 B1* | 6/2001 | Roberts | 398/147 |
| 6,304,369 B1 | 10/2001 | Piehler | 359/337.4 |
| 6,441,932 B1 | 8/2002 | Helkey | 359/110 |
| 6,915,084 B2* | 7/2005 | Ho et al. | 398/208 |
| 2001/0028760 A1 | 10/2001 | Yaffe | |
| 2002/0018268 A1 | 2/2002 | Price et al. | |
| 2002/0024694 A1 | 2/2002 | Newell et al. | |
| 2002/0106148 A1 | 8/2002 | Schemmann et al. | |
| 2003/0011847 A1 | 1/2003 | Dai et al. | |
| 2004/0197103 A1* | 10/2004 | Roberts et al. | 398/159 |

FOREIGN PATENT DOCUMENTS

| | | |
|---|---|---|
| EP | 0 524 758 | 1/1993 |
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Article "High-Dynamic-Range Laser Amplitude and Phase Noise Measurement Techniques"Ryan P. Scott et al., IEEE Journal on Selected Topics in Quantum Electronics, vol. 7, No. 4 Jul./Aug. 2001.

(Continued)

*Primary Examiner*—M. R. Sedighian
(74) *Attorney, Agent, or Firm*—Kent Daniels; Ogilvy Renault LLP (57) ABSTRACT

Laser line-width compensation is performed by detecting noise in an optical signal output by a laser of an optical communications system and controlling a complex modulator to cancel the detected noise. Line-width compensation can be performed for both amplitude and phase noise in the optical signal. Noise measurements are used to compute a complex scalar. The complex scalar is used by a compensation processor to modify an input signal that is to be transmitted by the optical communications system. The modified input signal controls the complex modulator, which modulates the output signal to cancel the noise.

28 Claims, 4 Drawing Sheets

OTHER PUBLICATIONS

EE Expert Anton Kruger Passive/Active Components, PIN Photodiodes by Anton Kruger, http://www.chipcenter.com, Mar. 24, 2003.

Laser Linewidth 9006-010, http;//.coseti.org, Mar. 17, 2003.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

Sadhwani, Ram et al "Adaptive CMOS Predistortion Linearizer for Fiber-Optic Links", Journal of Lightwave Technology, Dec. 2003, pp. 3180-3193, vol. 21, No. 12., U.S.A.

Andre, P.S. et al "Extraction of DFB Laser Rate Equations Paramters for Optical Simulation Purposes", Conftele 99 ISBN 972-98115-0-4, pp. 561-564.

Illing, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and A Tunable Electronic Equalizer", WDD34, pp. 1-4.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Direct Digital Synthesis Applications", GaAs IC Symposium, pp. 61-64.

Kamoto, T. et al "An 8-bit 2-ns Monolithic DAC", IEEE Journal of Solid-State Circuits, Feb. 1988, vol. 23, No. 1.

* cited by examiner

METHOD AND APPARATUS FOR LASER LINE-WIDTH COMPENSATION

CROSS-REFERENCE TO RELATED APPLICATIONS

This is the first application filed for the present invention.

MICROFICHE APPENDIX

Not Applicable.

TECHNICAL FIELD

This invention relates to optical communications systems and, in particular, to a method and apparatus for compensating a line-width of an optical signal output by a laser of an optical transmitter in an optical communications system.

BACKGROUND OF THE INVENTION

Optical communications systems are used for economically transferring large volumes of data over long distances. Economies are improved if fiber link length is extended without repeaters. Single-mode lasers are commonly used in long-haul networks. As is well understood in the art, the output of a single-mode laser is composed of phase and amplitude noise that is present in the output optical spectrum, along with desired single spectral tone. The broadband amplitude noise is called Relative Intensity Noise (RIN) measured in dBc. The narrowband noise is usually measured in MHz full width of the spectrum where the optical power density is −3 dB, −10 dB, or −20 dB, relative to peak power. This is referred to as the laser line-width. This narrowband noise is often predominantly phase noise. The line-width of a distributed feedback (DFB) laser is generally 1-to-10 MHz.

The performance of optical transmission systems with long-haul optical spans is impacted by significant amounts of net optical chromatic dispersion. On such systems, the phase noise of the laser source is substantially converted to amplitude noise by the action of the dispersion, at a level that can significantly degrade performance. In order to achieve coherent long-haul optical transmission and reception, a narrow laser line-width is required.

Nonetheless, it is desirable to be able to use lasers with larger line-widths in order to obtain other desired properties, such as a wide range of tuning wavelengths, without the propagation degradation associated with excess laser line-width. It is known to use control loops to tune the laser frequency by adjusting bias current in order to mitigate phase noise. The frequency tuning responses of lasers are in general due to thermal and carrier density effects, which are both a function of the electrical bias current. However, these effects have different phase responses, so the complex sum of the two effects creates an amalgamated tuning response that severely degrades in the region of 1 MHz. Frequency tuning does not help amplitude noise, and often creates more amplitude variations, rather than reducing them.

It is known to use an end-line phase modulator to correct "chirp" and other bounded phase excursions. Such modulators have been made using the electro-optic effect of Lithium Niobate. However, phase modulators have a limited dynamic range that is generally exceeded by phase noise output by most lasers. Phase modulators are also expensive to add to an optical transmission system.

There are known advantages to be derived from compensating for phase and amplitude noise. The advantages include the prevention of multi-path interference (further described in applicant's U.S. Pat. No. 5,999,258), and compensation of certain non-linear distortion effects, such as four-wave mixing, which is greatly facilitated by eliminating rapid perturbations caused by line-width noise. A detailed discussion of nonlinear optical effects is provided by Agrawal, Govind P., "Nonlinear Fiber Optics", $2^{nd}$, Ed., Academic Press, Inc., San Diego, Calif., 1995 (ISBN 0-12-045142-5).

Various systems have been proposed for compensating for amplitude in optical signals. These systems typically operate in the optical domain by filtering or canceling the noise using different interference techniques that are well known in the art. Unfortunately, the introduction of optical components reduces the signal to noise ratio of the optical signal.

U.S. Pat. No. 6,304,369 entitled METHOD AND APPARATUS FOR ELIMINATING NOISE IN ANALOG FIBER LINKS, which issued to Piehler on Oct. 16, 2001, describes a transmission system that uses an interference technique for canceling RIN. The RIN is cancelled by transmitting two copies of the modulated signal over two respective optical fiber links extending between a sender and a receiver; and recombining them at the receiver. This method requires that half the intensity of the output be transported over each link, and introduces optical components that further reduce the optical signal strength.

A similar technique for cancelling narrowband noise is provided by Helkey in U.S. Pat. No. 6,441,932, which issued on Aug. 27, 2002. Helkey's system does not require two optical paths over a substantial part of the link, however it does introduce an optical attenuator, which reduces signal strength.

U.S. Pat. No. 5,761,225, entitled OPTICAL FIBER AMPLIFIER ELED LIGHT SOURCE WITH A RELATIVE INTENSITY NOISE REDUCTION SYSTEM, which issued to Fidric et al. on Jun. 2, 1998, teaches a method for amplifying, and reducing RIN in an emission of an optical power source. Fidric et al.'s system employs optical filters and a fiber amplifier to provide feedback to the power source. In accordance with Fidric et al., all of the compensation for RIN is applied in the optical domain prior to the modulation of data.

Accordingly, a method and apparatus for effectively reducing line-width of an optical output signal emitted by a laser in an optical communications transmission system remains highly desirable.

SUMMARY OF THE INVENTION

It is therefore an object of the invention to provide a method and apparatus for effectively reducing line-width of an optical output signal emitted by a laser in an optical transmission system.

The invention therefore provides a method for compensating a laser line-width of an optical signal output by a laser of an optical communications system. The method comprises steps of dynamically detecting noise in the optical signal; periodically computing a compensation scalar for reducing the detected noise; modifying, in the electrical domain, an input signal to be conveyed through the optical communications system, the input signal being modified using the compensation scalar to generate a modified input signal; and modulating the optical signal using the modified input signal.

The steps of detecting, computing and modifying may be performed in either of a feed-forward compensation system or a feed-back compensation system.

The step of detecting noise in the optical signal comprises detecting at least one of amplitude noise and phase noise of the optical signal. In detecting amplitude noise, a power level of the optical signal is measured at a predetermined sampling rate. In detecting phase noise a combined signal comprising a sample of the optical signal and a phase delayed sample of the optical signal is monitored, and a power level of the combined signal is measured at the predetermined sampling rate.

Periodically computing the compensation scalar comprises computing a mean value of the detected power level; and computing a magnitude component of the compensation scalar by dividing the mean value by a current value of the detected power level.

Periodically computing the compensation scalar further comprises computing a phase component of the compensation scalar by computing a current phase change, and subtracting the current phase change from a phase component of an immediately previous instance of the compensation scalar.

Computing the phase change comprises calculating an Arc-cosine of the detected power level of the combined signal divided by the detected power level of the optical signal.

Modifying the input signal comprises passing the compensation scalar to a complex multiplier, which multiplies an input signal and the compensation scalar to generate the modified input signal.

Prior to modulating the output signal using the modified input signal, the output signal may be delayed for a period of time required to perform the steps of detecting, computing and modifying, plus a time required to pass the modified input signal to the complex modulator.

Link affect pre-compensation may also be performed on the input signal prior to modifying the input signal using the compensation scalar. Typically, the modified input signal is converted from a digital signal to an analog signal used for modulating the output signal.

The invention also provides an apparatus for compensating a laser line-width of an optical signal output by a laser of an optical communications system. The apparatus comprises a noise detector for detecting noise in the output signal; a circuit for computing a compensation scalar using the noise detected in the optical signal; and a compensation processor that operates in the electrical domain to modify an input signal to be conveyed through the optical communications system, the compensation processor modifying the input signal using the compensation scalar to generate a modified input signal for controlling a complex modulator used to modulate the output signal.

The noise detector comprises a power level detector adapted to sample the output signal at a predetermined sampling rate. The power level detector is connected to an optical tap coupled to an optical fiber carrying the output signal, the optical tap diverting a sample of the output signal to the power level detector, which detects a power level of the sample. The noise detector comprises means for generating a combined signal using a sample of the optical signal and a phase delayed sample of the optical signal; and a power level detector for detecting a power level of the combined signal at the predetermined sampling rate.

The power level detector preferably samples the combined signal at a rate equal to a phase delay of the phase delayed sample.

The means for generating the combined signal comprises first and second optical taps coupled to an optical fiber carrying the output signal to generate respective first and second samples of the output signal; means for phase shifting the first sample with respect the second sample; and means for combining the phase-shifted first sample and the second sample to generate the combined signal.

The means for phase shifting comprises a length of optical fiber between the fist and second optical taps, such that an optical path length through the first optical tap to the means for combining is different than an optical path length through the second optical tap to the means for combining.

The circuit for computing a compensation scalar comprises means for computing a mean value of the power level of the output signal; and means for computing an amplitude component of the compensation scalar by dividing the mean value by a current value of the power level of the output signal.

The circuit for computing the compensation scalar comprises means for computing a mean value of the power level of the combined signal; means for computing a current phase change of the combined signal; and means for computing a phase component of the compensation scalar by subtracting the current phase change from a phase component of an immediately preceding instance of the compensation scalar.

The means for computing the current phase change comprises means for dividing a detected power level of the combined signal by the detected power of the optical signal to yield a detected power level ratio; and means for computing an arc-cosine of the detected power level ratio.

The compensation processor comprises a complex multiplier adapted to multiply the input signal and the compensation scalar to generate the modified output signal. The compensation processor further comprises respective digital-to-analog converters for converting orthogonal signal components into corresponding analog signal components for controlling the complex modulator.

The apparatus may further comprise at least one digital filter adapted to perform link affect pre-compensation modifications to the input signal before the input signal is input to the compensation processor.

The apparatus may also further comprise means for delaying the output signal between the optical emitter and the complex modulator for a period of time adequate to permit the power level detectors to detect the power levels of the output signal and the combined output signal, to permit the circuit to calculate the compensation scalar, to permit the compensation processor to generate the modified output signal, and to permit the modified output signal to be output to the complex modulator.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a means for laser line width compensation, to provide a more stable optical signal to serve as a carrier for data in an optical communications system. Noise is detected in an optical output signal emitted by a laser of the optical communications system. The detected noise may be amplitude noise and/or phase noise. The detected noise is used to calculate a compensation scalar. The compensation scalar is used by a compensation processor to modify an input signal containing data to be transmitted by the optical communications system. The optical output signal is delayed in the optical domain while the compensation scalar is calculated and the input signal is modified in the electrical domain. The modified input signal is used to control a complex modulator that modulates the delayed optical output signal to cancel the detected noise while applying the data to be transmitted by the optical communications system.

Figure 1:
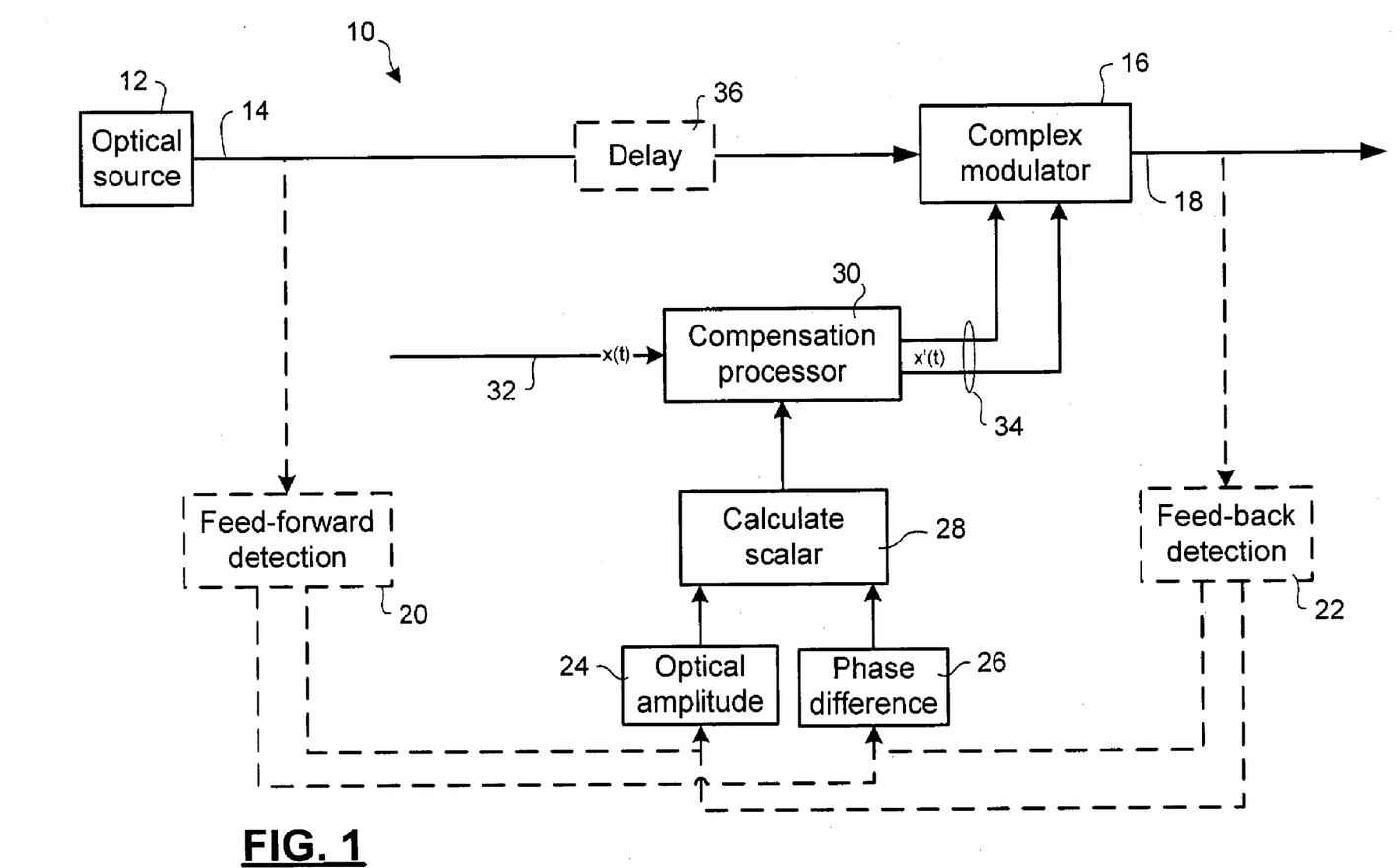
FIG. 1 schematically illustrates functional components of an optical transmitter equipped with a laser line-width compensation apparatus in accordance with the present invention.

FIG. 1 schematically illustrates principal components of an optical transmitter equipped with a laser line-width compensation apparatus in accordance with the present invention. The line-width compensation system 10 reduces noise in an output optical signal 14 emitted by an optical source 12 by controlling a complex modulator 16 to cancel the noise while applying an input signal x(t) to the output optical signal 14.

As explained above, broadband amplitude noise (RIN) and narrowband noise, often predominantly phase noise, both contribute to laser line-width. The RIN and phase noise can be detected and compensated for using feed-forward detection 20 or feed-back detection 22. In general, the feed-forward detection 20 is preferred, because in applications where the complex modulator 16 is modulating data onto the optical signal, the data can complicate the derivation of phase information, making the feed-back detection 22 less desirable.

In either case, the detection system detects at least phase difference 26 using methods explained below with reference to FIG. 2 and, optionally, optical amplitude 24. In some lasers, amplitude noise is minimal and compensating for amplitude noise is not required. The noise measurements are passed to a circuit 28, which calculates a compensation scalar, as will be explained below with reference to FIG. 3. The compensation scalar 28 is passed to a compensation processor which also receives an input data signal 32 that normally contains data to be transmitted by the line-width compensation system 10. The compensation processor 30 modifies the input data signal 32 using the compensation scalar calculated by circuit 28, and outputs a modified input signal 34. The modified input signal 34 is passed to a complex modulator 16 which modulates the output optical signal 14 using the modified input signal 34 to cancel detected noise and place the data on the carrier signal. The modulated optical signal 18 is transmitted over an optical link in a manner well known in the art.

If feed-forward detection 20 is used, the output optical signal 14 is delayed in the optical domain by a delay 36, using methods well known in the art, while detection and compensation processing is performed in the electrical domain. Thus, noise detected by the feed-forward detection 20 is applied to the same output optical signal 14 in which the noise was detected.

Figure 2:
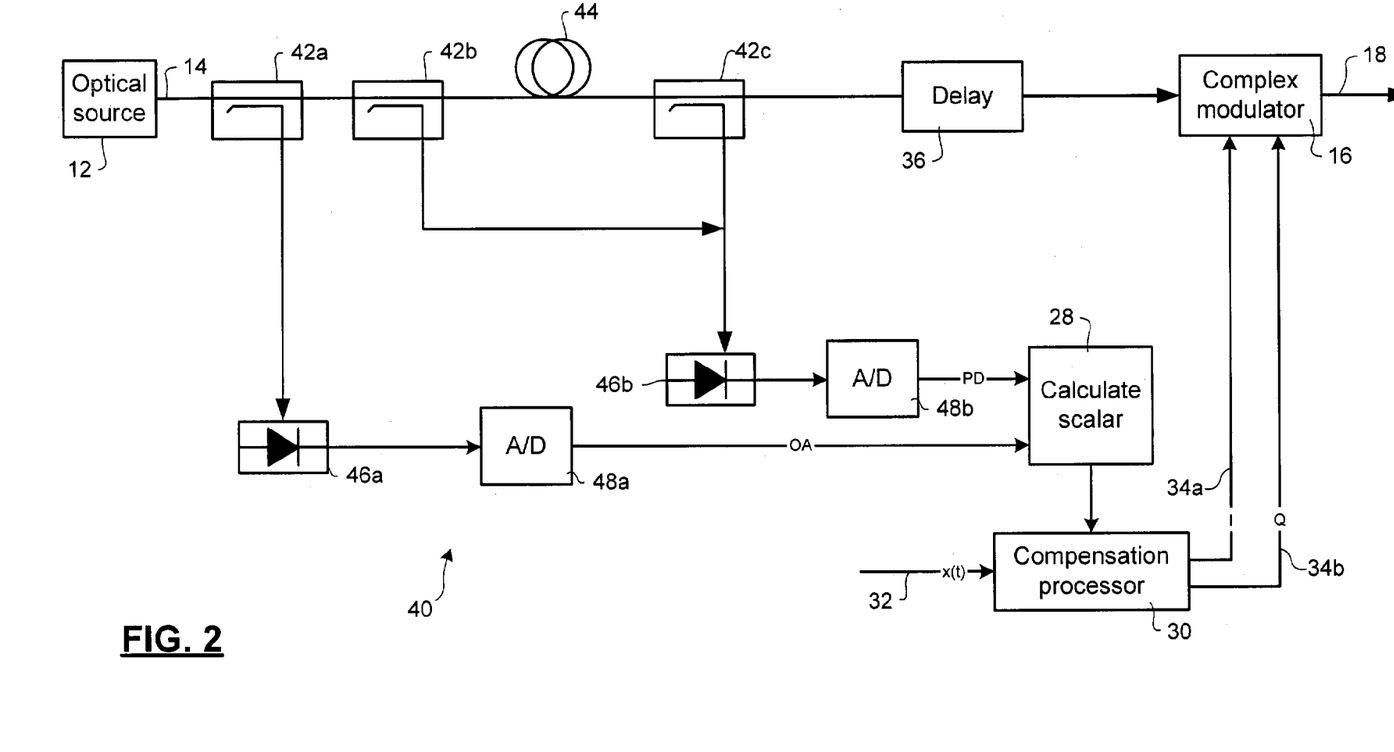
FIG. 2 schematically illustrates functional components of an optical transmitter equipped with an embodiment of a feed-forward laser line-width compensation system in accordance with the invention.

FIG. 2 schematically illustrates a feed-forward compensation system 40 in accordance with an embodiment of the invention. Techniques for measuring optical phase and amplitude are known. One convenient way of measuring optical phase and amplitude is to measure a power level, and a phase difference over a given time delay. Power level (optical amplitude) is measured, for example, using an optical tap 42a which transfers a sample of the optical output signal 14 to a P-Intrinsic-N (PIN) diode 46a connected to a linear amplifier (not shown) and an analog-to-digital A/D converter 48a that outputs a digital representation of the absolute amplitude (AA) of the optical output signal 14.

The phase difference can be measured by splitting the optical signal into two paths of different length. The split signal is recombined and the resulting power level is measured, as will be explained below in more detail with reference to FIG. 3. The recombined power level is proportional to a cosine of one half of the phase difference. The phase difference consists of a static portion and a dynamic portion. The static portion is determined by the precise path-length difference traveled by samples of the optical output signal 14 captured by optical taps 42b and 42c, respectively, before the samples are recombined, and the frequency of the pure optical tone. It is desirable to have a static phase difference of +90°. This can be maintained through temperature-induced variations by slowly tuning the wavelength or frequency, or by slowly tuning the path length difference 44. A static difference of −90° yields the wrong sign for the phase information. Consequently, the slow tuning loop must be designed to lock on a correct slope.

The phase difference can be measured by splitting the optical signal into two paths of different length. The split signal is recombined and the power level of the resulting combined signal is measured, as will be explained below in more detail with reference to FIG. 3. The recombined power level is proportional to a cosine of one half of the phase difference. The phase difference consists of a static portion and a dynamic portion. The static portion is determined by the precise path-length difference traveled by samples of the optical output signal 14 captured by optical taps 42b and 42c, respectively, before the samples are recombined, and the frequency of the pure optical tone. It is desirable to have a static phase difference of +90°. This can be maintained through temperature-induced variations by slowly tuning the wavelength or frequency, or by slowly tuning the path length difference 44. A static difference of −90° yields the wrong sign for the phase information. Consequently, the slow tuning loop must be designed to lock on a correct slope.

Figure 3:
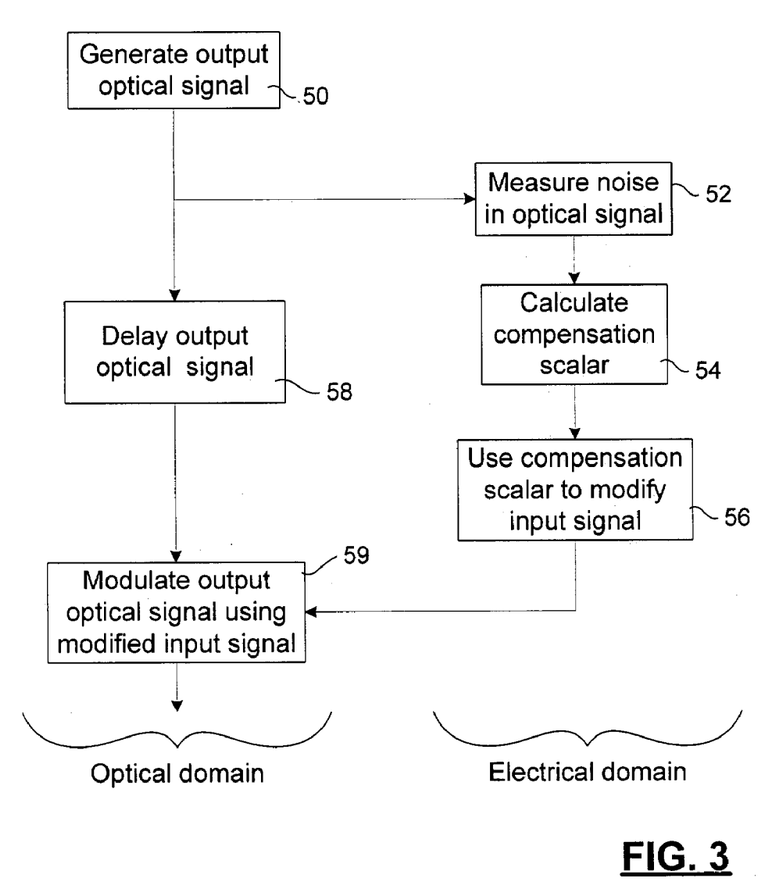
FIG. 3 is a flow chart illustrating the method in accordance with the invention.

FIG. 3 is a simple flow diagram illustrating the method in accordance with the invention. As explained above, the method is practised in the optical domain and the electrical domain. In step 50, an optical output signal is generated by an optical laser in a manner well known in the art. As described above with reference to FIG. 2, noise contributing to laser line-width in the optical signal is measured (step 52). The compensation scalar is calculated in step 54. In order to calculate the compensation scalar, the phase change during a last measurement period is calculated using the formula:

Phase Change=arc-cosine (P/AA) (001)

wherein:

P=the optical power of the combined signal measured by the phase monitor (e.g. at PIN diode 46b), and AA=the absolute optical power measured by the amplitude monitor (e.g. at PIN diode 46a).

The compensation scalar is a complex value having a magnitude and a phase. The magnitude is calculated using the formula:

$$\text{Magnitude} = MA/AA \tag{002}$$

wherein:

MA=mean amplitude; and

AA=current absolute amplitude.

The phase is calculated using the formula:

$$\text{Phase} = p_L - p_C \tag{003}$$

wherein:

$p_L$=phase of the last instance of the compensation scalar; and $p_C$=current phase change (per equation 001).

The compensation scalar calculated in step 54 is passed to the compensation processor 30 in step 56. Compensation processor 30 (FIG. 2) includes a complex multiplier that multiplies the input data signal 32 by the compensation scalar, as will be explained below with reference to FIGS. 4a and 4b. The modified input signal is used in step 59 to modulate the output optical signal after the output optical signal has been delayed in the optical domain (step 58) by a time required to perform steps 52–56.

Figure 4A:
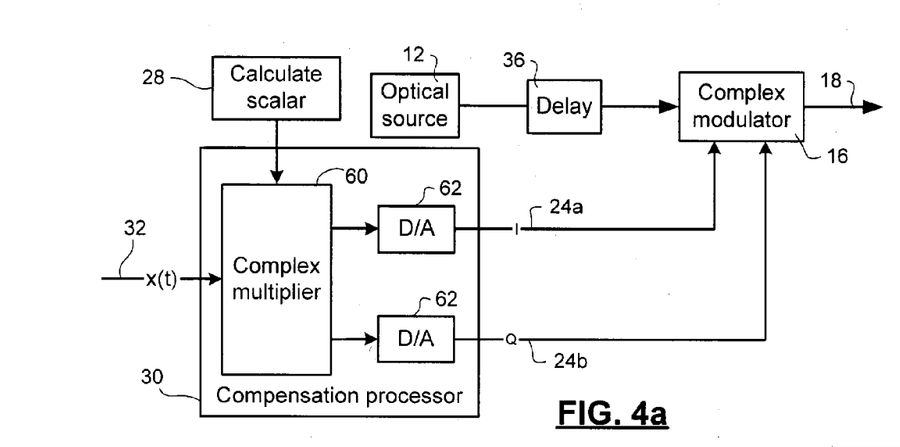
FIG. 4a schematically illustrates an embodiment of the laser line-width compensation system shown in FIG. 2.

FIG. 4a is a schematic diagram of a compensation processor 30 in accordance with one embodiment of the invention. As explained above, the compensation processor includes a complex multiplier 60, which accepts input from the circuit 28 for calculating the compensation scalar and an input signal 32 containing data to be transmitted by the optical communication system. In accordance with one embodiment of the invention, each of the real and imaginary parts of the compensation scalar have 6 bits covering a range of −1 to +1. The circuit 28 for calculating the compensation scalar is, for example, a digital signal processor (DSP) that operates at 20 MHz. Either digital or analog multiplication can be used. However, in the embodiment shown in FIG. 4a the complex multiplier 60 is digital. The complex multiplication of the input signal 32 by the compensation scalar can compensate for all phase and amplitude noise that has frequency components of less than half of the update rate of the compensation scalar. Output from the complex multiplier 60 is passed to D/As 62, which converts the digital signals to analog signals passed to the complex modulator 16 in, for example, in-phase (I) and quadrature (Q) modulation format.

Figure 4B:
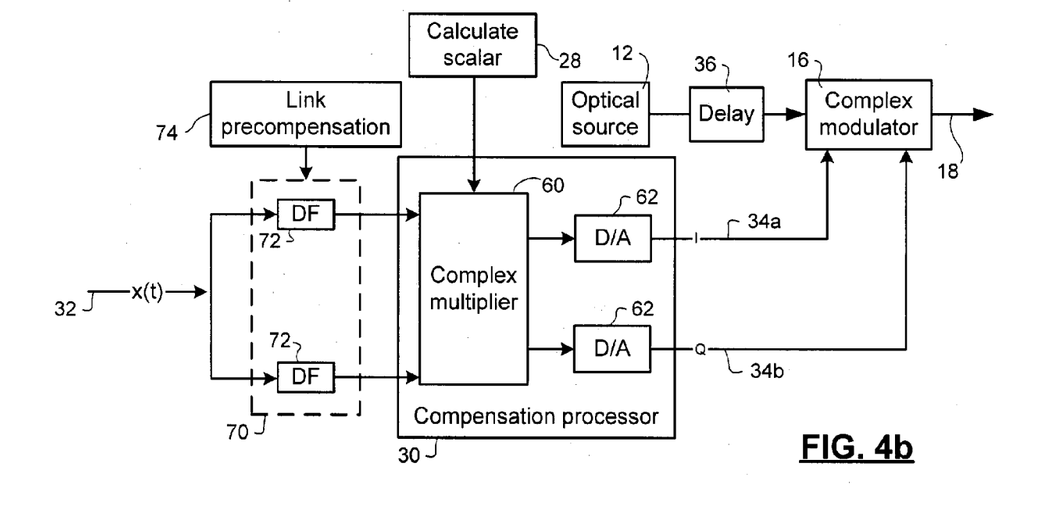
FIG. 4b schematically illustrates another embodiment of the laser line-width compensation system shown in FIG. 2.

FIG. 4b is a schematic diagram of a further embodiment of the invention. In accordance with this embodiment of the invention, signal quality and transmission reach are further improved by pre-compensation for link affects, in addition to laser line-width compensation performed as explained above. In this embodiment, digital filters 72 receive link-affect pre-compensation data from link-affect pre-compensation processors 74, which operate as described in Applicant's copending patent application Ser. No. 10/262,944 filed on Oct. 3, 2002, the specification of which is incorporated herein by reference. The input signal 32 is processed by the digital filters 72 to effect the required pre-compensation before the input signal 32 is passed to the complex multiplier 60. Thereafter, input signal processing proceeds as described above.

As will be understood by persons skilled in the art, a complex modulator 16 may be used for laser line-width compensation only. In that case, the complex multiplier is not required and the compensation scalar can be output directly to the complex modulator 16 in order to effect line-width compensation before data modulation is performed.

The embodiments of the invention described above are intended to be exemplary only. The scope of the invention is therefore intended to be limited solely by the scope of the appended claims.

We claim:

1. A method for compensating a laser line-width of an optical signal the method comprising steps of:
   dynamically detecting noise in the optical signal;
   periodically computing a compensation scalar for reducing the detected noise;
   modifying, in the electrical domain, an input signal to be conveyed via the optical signal, the input signal being modified using the compensation scalar to generate a modified input signal; and
   modulating the optical signal using the modified input signal.

2. The method as claimed in claim 1 wherein the steps of detecting, computing and modifying are performed in a feed-forward compensation system.

3. The method as claimed in claim 1 wherein the steps of detecting, computing and modifying are performed in a feed-back compensation system.

4. The method as claimed in claim 1 wherein the step of detecting noise in the optical signal comprises:
   detecting at least one of amplitude noise and phase noise of the optical signal.

5. The method as claimed in claim 4 wherein the step of detecting amplitude noise comprises a step of detecting a power level of the optical signal at a predetermined sampling rate.

6. The method as claimed in claim 5 wherein the step of detecting phase noise comprises steps of:
   generating a combined signal comprising a sample of the optical signal and a phase delayed sample of the optical signal; and
   detecting a power level of the combined signal at the predetermined sampling rate.

7. The method as claimed in claim 1 wherein step of periodically computing a compensation scalar comprises:
   computing a mean value of the detected power level; and
   computing a magnitude component of the compensation scalar by dividing the mean value by a current value of the detected power level.

8. The method as claimed in claim 6 wherein the step of periodically computing a compensation scalar comprises:
   computing a phase component of the compensation scalar by computing a current phase change and subtracting the current phase change from a phase component of an immediately previous instance of the compensation scalar.

9. The method as claimed in claim 8 wherein the step of computing the phase change comprises:
   calculating an Arc-cosine of the detected power level of the combined signal divided by the detected power level of the optical signal.

10. The method as claimed in claim 1 wherein the step of modifying the input signal comprises:

passing the compensation scalar to a complex multiplier, which multiplies the input signal by the compensation scalar to generate the modified input signal.

11. The method as claimed in claim 2 further comprising steps of:

prior to modulating the output signal using the modified input signal, delaying the output signal for a period of time required to perform the steps of detecting, computing and modifying, plus a time required to pass the modified input signal to a complex modulator used to modulate the output signal.

12. The method as claimed in claim 1 further comprising a step of performing link affect pre-compensation on the input signal prior to modifying the input signal.

13. The method as claimed in claim 1 further comprising converting the modified input signal from a digital signal to an analog signal used for modulating the output signal.

14. Apparatus for compensating a line-width of an optical signal, the apparatus comprising:

a noise detector for detecting noise in the optical signal;
a circuit for computing a compensation scalar using the noise detected in the optical signal; and
a compensation processor that operates in the electrical domain to modify an input signal to be conveyed via the optical signal, the compensation processor modifying the input signal using the compensation scalar to generate a modified input signal for controlling a modulator used to modulate the output signal.

15. The apparatus as claimed in claim 14 wherein the noise detector comprises a power level detector adapted to sample the output signal at a predetermined sampling rate.

16. The apparatus as claimed in claim 15 wherein the power level detector is connected to an optical tap coupled to an optical fiber carrying the output signal, the optical tap diverting a sample of the output signal to the power level detector, which detects a power level of the sample.

17. The apparatus as claimed in claim 14 wherein the noise detector comprises:

means for generating a combined signal using a sample of the optical signal and a phase delayed sample of the optical signal; and
a power level detector for detecting a power level of the combined signal at the predetermined sampling rate.

18. The apparatus as claimed in claim 17 wherein the power level detector samples the combined signal at a rate equal to a phase delay of the phase delayed sample.

19. The apparatus as claimed in claim 17 wherein the means for generating the combined signal comprises:

first and second optical taps coupled to an optical fiber carrying the output signal to generate respective first and second samples of the output signal;
means for phase shifting the first sample with respect the second sample; and
means for combining the phase-shifted first sample and the second sample to generate the combined signal.

20. The apparatus as claimed in claim 19 wherein the means for phase shifting comprises a length of optical fiber between the fist and second optical taps, such that an optical path length through the first optical tap to the means for combining is different than an optical path length through the second optical tap to the means for combining.

21. The apparatus as claimed in claim 16 wherein the circuit for computing a compensation scalar comprises:

means for computing a mean value of the power level of the output signal; and
means for computing an amplitude component of the compensation scalar by dividing the mean value by a current value of the power level of the output signal.

22. The apparatus as claimed in claim 17 wherein the circuit for computing the compensation scalar comprises:

means for computing a mean value of the power level of the combined signal;
means for computing a current phase change of the combined signal; and
means for computing a phase component of the compensation scalar by subtracting the current phase change from a phase component of an immediately preceding instance of the compensation scalar.

23. The apparatus as claimed in claim 22 wherein the means for computing the current phase change comprises:

means for dividing a detected power level of the combined signal by the detected power of the optical signal to yield a detected power level ratio; and
means for computing an arc-cosine of the detected power level ratio.

24. The apparatus as claimed in claim 14 wherein the compensation processor comprises a complex multiplier adapted to multiply the input signal and the compensation scalar to generate the modified output signal.

25. The apparatus as claimed in claim 24 wherein the compensation processor is further adapted to generate respective optical components of the modified input signal.

26. The apparatus as claimed in claim 25 wherein the compensation processor further comprises respective digital-to-analog converters for converting each of the orthogonal signal components into corresponding analog signal components for controlling the complex modulator.

27. The apparatus as claimed in claim 14 further comprising at least one digital filter adapted to perform link affect pre-compensation modifications to the input signal before the input signal is input to the compensation processor.

28. The apparatus as claimed in claim 14 further comprising means for delaying the optical signal between an optical emitter and the modulator for a period of time adequate to permit the circuit to calculate the compensation scalar.

* * * * *

UNITED STATES PATENT AND TRADEMARK OFFICE
CERTIFICATE OF CORRECTION

PATENT NO. : 7,200,339 B1
APPLICATION NO. : 10/411332
DATED : April 3, 2007
INVENTOR(S) : Kim Roberts It is certified that error appears in the above-identified patent and that said Letters Patent is hereby corrected as shown below:

Col. 6, Lines 20-37 delete paragraph and insert the following paragraph:

The phase difference can be measured by splitting the optical signal into two paths of different length. The split signal is recombined and the power level of the resulting combined signal is measured, as will be explained below in more detail with reference to FIG.3. The recombined power level is proportional to a cosine of one half of the phase difference. The phase difference consists of a static portion and a dynamic portion. The static portion is determined by the precise path-length difference traveled by samples of the optical output signal 14 captured by optical taps 42b and 42c, respectively, before the samples are recombined, and the frequency of the pure optical tone. It is desirable to have a static phase difference of $+90°$. This can be maintained through temperature-induced variations by slowly tuning the wavelength or frequency, or by slowly tuning the path length difference 44. A static difference of $-90°$ yields the wrong sign for the phase information. Consequently, the slow tuning loop must be designed to lock on a correct slope.

Col. 6, Lines 38-55, delete paragraph and insert the following paragraph:

The choice of path length 44 is a balance between resolution and dynamic range. The measured result due to a small phase change is in proportion to the path length difference. If the result is too small, the result will be degraded by electrical noise. However, a phase shift of more than $90°$ can result in cycle slipping and incorrect phase information. For a laser line-width of about 5 MHz (full-width 20 dB down), a path link difference of 2 meters of polarization-preserving fiber can be used. This provides a 10-nanosecond relative delay between the respective optical taps 42b, 42c. When the power of the combined phase-shifted sample is measured by a PIN diode 46b, the output of which is fed to a linear amplifier (not shown) and an A/D converter 48b. The phase difference measurement (P) is output to the compensation processor 30. As explained above, the compensation processor uses the scalar to modify the input signal 32 and outputs a modified output signal 34a, 34b, for example, using in-phase and quadrature modulation well known in the art. In one embodiment, the output optical signal 14 is delayed in the optical domain by a delay 36, which is preferably equal to the time required for amplitude and phase noise detection, calculation of the compensation scalar and compensation processing. Thus, noise cancellation effected when the complex modulator 16 modulates the output optical signal 14 cancels the detected noise.

UNITED STATES PATENT AND TRADEMARK OFFICE
CERTIFICATE OF CORRECTION

PATENT NO. : 7,200,339 B1
APPLICATION NO. : 10/411332
DATED : April 3, 2007
INVENTOR(S) : Kim Roberts It is certified that error appears in the above-identified patent and that said Letters Patent is hereby corrected as shown below:

Col. 6, Lines 38-55, (cond't)
The complex modulator 16 is, for example, a MACH-ZENDER modulator, well known in the art.

Signed and Sealed this

Twenty-sixth Day of June, 2007

JON W. DUDAS
*Director of the United States Patent and Trademark Office*